United States Patent

[11] 3,622,526

[72] Inventors Bruno Zorn
Cologne-Flittard;
Harald Oertel, Leverkusen, both of Germany
[21] Appl. No. 688,692
[22] Filed Dec. 7, 1967
[45] Patented Nov. 23, 1971
[73] Assignee Farbenfabriken Bayer Aktiengesellschaft
Leverkusen, Germany
[32] Priority Dec. 13, 1966
[33] Germany
[31] F 50915

[54] WATER VAPOR PERMEABLE POROUS SHEET STRUCTURES AND PROCESS THEREFOR
6 Claims, No Drawings
[52] U.S. Cl. ................................................. 260/2.5 AK,
117/135.5, 117/161 KP, 260/2.5 AY, 260/37 N, 260/858
[51] Int. Cl. ................................................. C08g 22/44,
C08g 51/08, C08g 53/08
[50] Field of Search ............................................. 260/2.5
AX, 2.5 AK, 77.5 MP, 2.5 AL, 2.5 M, 37 N, 2.5 AY; 117/161 KP, 135.5

[56] References Cited
UNITED STATES PATENTS

| | | | |
|---|---|---|---|
| 3,208,875 | 9/1965 | Holden .......................... | 117/135.5 |
| 3,360,394 | 12/1967 | Griffin et al. ................. | 117/63 |
| 3,460,969 | 8/1969 | Murphy ......................... | 117/63 |
| 3,330,791 | 7/1967 | Mater et al. .................. | 260/28 |

FOREIGN PATENTS

| | | | |
|---|---|---|---|
| 664,363 | 6/1963 | Canada ......................... | 260/2.5 M |
| 671,478 | 10/1963 | Canada ......................... | 260/2.5 M |
| 6,413,691 | 5/1965 | Netherlands | |

*Primary Examiner*—Donald E. Czaja
*Assistant Examiner*—H. S. Cockeram
*Attorneys*—Clelle W. Upchurch and Gene Harsh

ABSTRACT: Water-permeable porous sheet structures are prepared by adding an inorganic filler which has a shaken volume of from 3 to 20 cc. per gram into a solution of a polyurethane urea and then treating the polyurethane-urea solution with a nonsolvent which is miscible with the solvent and shaping the solution to form a water-permeable porous sheet structure with removal of the solvent and the nonsolvent.

WATER VAPOR PERMEABLE POROUS SHEET STRUCTURES AND PROCESS THEREFOR

This invention relates to water permeable porous sheet structures and a process for the preparation thereof. More particularly this invention relates to a polyurethane sheetlike structures which are permeable to water vapor.

From Netherlands Pat. Specification No. specification 66.11626 it is known to add 2 to 15 percent by weight of a thixotropic material to polyurethanes in producing microporous sheets. This material may be silicon dioxide filler with a surface area of 200 m.$^2$/g.

The production of porous sheet structures which are permeable to water vapor by treating solutions of polyurethane ureas with a liquid in which the polyurethane ureas are insoluable, but which is miscible with the solvent, is already known. This process is, however, only of limited application and in practice often leads to formation of foils which have only slight permeability to water vapor.

It is therefore an object of this invention to provide water-permeable porous sheet structures which have improved properties and which can be prepared in a straightforward and economical process. Another object of the invention is to provide strong water vapor permeable polyurethane-urea sheet structures which have improved properties, particularly good water vapor permeability. Another object of this invention is to provide porous polyurethane-urea sheet structures which are formed directly onto porous supports. A further object of this invention is to provide polyurethane sheet structures which can be bonded to a porous substrate such as wood, split leather, fleece, textiles, or paper.

The foregoing objects and others are accomplished in accordance with the invention, generally speaking, by providing foils which have much higher permeability to water vapor in a highly reproducible manner from film-forming polyurethane ureas by adding a finely divided inorganic filler which is insoluble in the solvent and the liquid in which the polyurethane ureas are insoluble, hereinafter termed the nonsolvent, to the solutions of polyurethane ureas before carrying out a shaping process an and before the treatment with the aforesaid nonsolvent which is compatible with the solvent.

The present invention thus relates to a process for the production of porous sheet structures permeable to water vapor from solutions of film-forming polyurethane ureas by treating solutions thereof with a nonsolvent which is miscible with the solvent, characterized in that a finely divided inorganic filler which is insoluble in the solvent and the nonsolvent and has a volume when shaken of at least 3 cc. per gram is added to the solutions of polyurethane urea used for the process in a proportion of 25 to 90 percent by weight, based on the mixture of polyurethane urea and filler before the shaping process and before that addition of the nonsolvent.

Fillers which may be used are finely divided inorganic substances which are insoluble in the solvent and nonsolvent employed, and which have a shaken volume of at least 3 and preferably 6 to 20 cc. per gram.

The shaken volume may be found, for example, by determining the volume of a weighed quantity of filler after jolting it 50 times on a springy support (wood, lead plate). The volume should not undergo any marked change, i.e., more than about 1 to 2 percent, after further jolting.

As stated above it is essential to use these fillers in an amount of at least 25 percent. The main characteristic is the shaken volume, which has to be as high as possible. The filler thus is a material selected for its high content of internal voids and not for its thixotropic behavior or for its causing higher viscosity of the mixture. With the aid of such high shaken volume fillers polyurethane ureas may be used for producing microporous sheets, which is not easily possible without the fillers.

Suitable fillers include active charcoal, kieselguhr and silicic acids (silicon dioxide) or their salts with metals of the first to third main groups of the Periodic System, in particular calcium and aluminum salts. Silicic acid (silicon dioxide) and calcium or aluminum silicate that has been prepared by a thermal process or by precipitation and mixtures thereof, provided they satisfy the above requirements, are particularly desirable.

The fillers may be added to the polyurethane-urea solutions in the form in which they are first obtained or alternatively made up into a paste with two to three times their volume of a liquid, preferably the solvent for the polymer, in which case the filler is suitably stirred into the liquid. It is important that fine and uniform distribution of the filler in the polymer solution is achieved. This can e achieved, e.g., by the methods normally employed in the production of lacquers, e.g., by grinding, rolling, or intensive stirring. The proportion of filler to polyurethane urea lies between 25:75 and 90:10 and preferably between 25:75 and 50:50 parts by weight.

The higher the shaken volume and the more filler is added, the higher will be the permeability to water vapor of the resulting foils, but use of the preferred range is usually sufficient in order to combine sufficient strength of foil with good permeability to water vapor.

In addition to the polyurethane ureas, the solution may also contain other additives such as dyes, pigments, zinc-oxide, light protective agents, stabilizers, and other polymers which are soluble in the solvent used and insoluble in the nonsolvent, e.g., polyvinyl chloride, polyacrylonitrile and copolymers or graft polymers of acrylonitrile, butadiene and styrene.

Any polyurethane ureas which are film forming and have a molecular weight of at least 10,000 and are soluble in organic solvents, especially in highly polar organic solvents such as dimethylformamide, dimethylsulphoxide or dimethylacetamide, may be used in the process according to the invention.

Suitable polyurethane ureas are film-forming elastomers which in addition to urethane bonds also characteristically contain the unit

—R'—NH.CO.NH— if desired as portions of such groups as the following:

—R'—NH.CO.NH—R—
—R'—NH.CO.NH—NH.CO—R—
—R'—NH.CO.NH—NH.CO.NH—R—
—R'—NH.CO.NH—NH.CO.O—R—

$$-R'-NH.CO.NH.N-R- \atop | \atop Alkyl$$

$$-R'-NH.CO.NH.N{\overset{CH_2-CH_2}{\underset{CH_2-CH_2}{\diagup\diagdown}}}N-$$

—R'—NH.CO.NH.NH.CO.NH. R'—
—R'—NH.CO.NH.NH.CO.NH.NH.CO.NH—R'—
—R'—NH.CO.NH.NH.CO.CO.NH.NH.CO.NH—R'— where R' denotes the difunctional radical of an organic diisocyanate and the radical R also denotes a difunctional organic radical. These polyurethane ureas are generally only soluble in highly polar solvents such as dimethylformamide.

The urea groups are formed, e.g., by the reaction of resinous or nonresinous high molecular weight diisocyanates with bifunctional chain-lengthening agents which contain hydrogen atoms that are reactive with isocyanates, linked to nitrogen atoms, such as primary (di)amines, hydrazine, carbohydrazide, (di)hydrazines, (di)hydrazides, (di)semicarbazides or (di)carbazic esters. Urea groups —R'—NH.CO.NH—R'—are also formed when water is used as a bifunctional chain-extending agent.

These elastomeric polyurethane ureas can be prepared by known processes. High molecular weight, substantially linear polyhydroxy compounds containing terminal hydroxyl groups and having a molecular weight of between 500 and 5,000 and, if desired, additional low molecular weight diols, are first reacted with an excess of diisocyanate to form a prepolymer which bears terminal isocyanate groups, i.e., a resinous, high molecular weight diisocyanate, and this is then reacted with water or with compounds which are bifunctional under the chosen reaction conditions and which have hydrogen atoms that are reactive with isocyanates linked to nitrogen atoms, optionally together with corresponding compounds containing their hydrogen atoms linked to oxygen. When diols are used as reactants with the resinous higher molecular weight diisocyanates together with the NH-functional compounds, this chain-lengthening reaction is preferably carried out in the melt or in inert solvents such as tetrahydrofuran or dioxane. Mixtures of high molecular weight dihydroxy compounds and low molecular weight diols may also be reacted with diisocyanates in the melt or inert solvents for direct formation of the polyurethane. If only NH-functional chain-lengthening agents are used, the chain-lengthening reaction is preferably carried out in highly polar, weight-miscible solvents of boiling point about 100° C. because these chain-lengthening agents have a much higher reactivity and reaction velocity than diols.

The preparation of these polyurethane-urea solutions has been described, e.g., in German Patent Specifications 888,766; 1,123,467; 1,150,517 and 1,154,937, German Auslegeschriften 1,161,007; 1,183,196 and 1,186,618, Belgian Patent Specifications 649,619; 646,637; 658,363; 664,344; 664,346 and 666,208, French Patent Specifications 1,360,082; 1,371,391 and 1,383,077 and U.S. Pat. Spec. Nos. 2,929,803; 2,929,804 and 3,040,003.

High molecular weight, substantially linear polyhydroxy compounds containing terminal hydroxyl groups which may be used in the process of the invention include polyesters, polyester amides, polyethers, polyacetals, polycarbonates, or poly-N-alkylurethanes which may contain ester, ether, amide, urethane or N-alkylurethane groups and have molecular weights between 500 and 5,000 and melting points generally below 60° C. and preferably below 45° C., or mixtures thereof.

Particularly important are polyesters of adipic acid and diols or, if desired, mixtures of diols such as ethylene glycol, propylene glycol, butanediol-(1,4), hexanediol-(2,5), 2,2-dimethyl-propanediol-(1,3), hexanediol-(1,6), 2-methyl-hexanediol-(1,6), 2,2-dimethyl-hexanediol-(1,3), p-bis-hydroxymethyl-cyclohexane, 3-methyl-pentanediol-(1,4) and 2,2-diethyl-propanediol-(1,3). Polyesters of adipic acid with diols or mixtures of diols that have five or more C-atoms are particularly preferred because such polyesters have relatively high resistance to hydrolysis and, if the diols contain alkyl radicals in a side chain are also used, they yield end products which have high elasticity at low temperatures. Polyesters obtained by polymerization of caprolactam with diethylene glycol within a narrow range of molecular weights are also very suitable starting materials.

Polyurethane ureas with excellent resistance to hydrolysis can also be obtained from polyalkylene ethers which contain hydroxyl end groups, e.g. polytrimethylene ether diols, polypropylene ether diols, and, in particular, polytetramethylene ether diols, which diols may also if desired be used as copolyethers (by incorporating small quantities of epoxides such as propylene oxide or epichlorohydrin by condensation) or after end group modification, e.g. replacement of the OH groups by the group —O.CO.N(alkyl).CH$_2$.CH$_2$.OH—. The use of polyepichlorohydrins which contain terminal OH groups within the given molecular weight range provides flameproof products.

Surprisingly, the process according to the invention can also be carried out by using polyhydroxyl compounds that are miscible with water, e.g., polyethylene ether diols, in which case polyurethanes which have a high water uptake are obtained.

Diisocyanates, which may, if desired, by used as mixtures, include aliphatic, cycloaliphatic, araliphatic, aromatic and heterocyclic diisocyanates. Particularly important are diisocyanates which have a symmetrical structure, e.g. diphenylmethane-4,4'-diisocyanate, diphenyldimethylmethane-4,4'-diisocyanate, 2,2',6,6'-tetramethyl-diphenylmethane-4,4'-diisocyanate, diphenyl-4,4'-diisocyanate, diphenylether-4,4'-diisocyanate, or their alkyl-, alkoxy- or halogen-substituted derivatives, toluene-2,4- and 2,6-diisocyanate and commercial mixtures thereof, 2,4-diisopropylphenylene-1,3-diisocyanate, m-or p-xylylene diisocyanate and $\alpha,\alpha,\alpha',\alpha'$-tetramethyl-p-xylylene diisocyanate, and alkyl- or halogen-substitution products of the above diisocyanates, e.g., 2,5-dichloro-p-xylylene diisocyanate or tetrachloro-p-phenylene diisocyanate. In addition, one may use dimeric toluylene-2,4-diisocyanate, bis-(3-methyl-4-isocyanatophenyl)-urea or naphthalene-1,5-diisocyanate. Aliphatic diisocyanates such as hexane-1,6 - diisocyanate, cyclohexyl-1,4-diisocyanate, dicyclohexylmethane-4,4'-diisocyanate, 1-isocyanato-3-isocyanatomethyl-3,5,5cis-and/or cis-and/or trans-m-hexahydroxylylene diisocyanate or 2,2,4-trimethylhexane-1,6-diisocyanate may also be used, if desired only as part of the total amount of diisocyanate used, and yield products which undergo only very little discoloration on exposure to light. Other diisocyanates, such as $\omega,\omega'$-di-(isocyanatoethyl)-benzene or 1,2,3,4,5,6-hexahydro-diphenylmethane-4,4'-diisocyanate, also yield products which undergo little discoloration in the light.

Preferred diisocyanates are diphenylmethane-4,4'-diisocyanate, isomeric toluylene diisocyanates containing, if desired, in admixture therewith, hexane-1,6-diisocyanate and dicyclohexylmethane-4,4'-diisocyanate.

The higher molecular weight polyhydroxyl compounds are reacted with the diisocyanates in a molar ratio of about 1:1.25 to 1:4.0, if desired in several stages, in the melt or in solvents which are inert to isocyanates, such as tetrahydrofuran, dioxane or chlorobenzene, at temperatures of about 40° to 150°, and preferably 70° to 105° C. The reaction times are so chosen that a substantially linear prepolymer with terminal NCO groups is obtained, which on reaction with approximately equivalent quantities of bifunctional chain lengthening agents yields a substantially linear elastomeric polyurethane urea which is soluble in highly polar solvents such as dimethylformamide, or a corresponding polyurethane.

If the polyhydroxyl compound has a relatively low molecular weight, e.g. 750 to 1,250, the reaction with disocyanates is preferably carried out in low NCO/OH ratios, e.g. of 1:1.75 to 1:1.25, whereas with polyhydroxyl compounds of high molecular weight, e.g. 1,700 to 2,500, it is preferable to employ higher NCO/OH ratios, e.g. of 1:3 to 1:1.75.

Low molecular weight diols (molecular weight preferably below 250) such as ethylene glycol, butanediol-(1,4), bis-N,N-($\beta$-hydroxyethyl)-methylamine, bis-N,N-($\beta$-hydroxypropyl)-methylamine, N,N'-bis-hydroxyethyl-piperazine or hydroquinone-bis-($\beta$-hydroxyethylether) may be used in addition to the higher molecular weight polyhydroxyl compounds, for example in quantities of 10 to 300 mols percent of the OH content, preferably 20 to 100 mols percent of the higher molecular weight polyhydroxyl compound. The use of diols which contain tertiary nitrogen atoms improve the dyeability of the reaction products and their resistance to light, and provides centers at which further after-treatments such as crosslinking reactions, for example with strongly alkylating compounds such as 4,4'-dichloromethyldiphenylether may be carried out.

The amount of NCO groups in the NCO prepolymers (based on solvent-free prepolymer) bears an important influence on the properties of the resulting polyurethanes and polyurethane ureas. It should amount to at least 0.50 percent by weight and preferably be between about 1.00 and 7.60 percent by weight, in particular between 1.5 and 4.0 percent by weight, in order that the polyurethanes or polyurethane ureas may have sufficiently high melting points, tensile strengths, elongations at break and tension values. When the chain-lengthening reaction is carried out using water, the NCO content is preferably higher, e.g. between 3.5 and 7.6 percent by weight. The chain-lengthening agents should have a molecular weight of 18 to about 500, preferably 32 to 350. Apart from water, the following compounds, or if desired mixtures thereof, are suitable for use as chain-lengthening agents; ethylene-diamine, 1,2- or 1,3-propylenediamine, 1,4-tetramethylene diamine, 1,6-hexamethylene diamine, 2,2,4-trimethyl-hexane-1,6-diamine, 1-methyl cyclohexane-2,4-diamine, 1-amino-3-aminomethyl-3,5,5-trimethyl cyclohexane, 4,4'-diaminodicyclohexyl-methane, bis-(γ-aminopropyl)-methylamine, bis-(β-aminoethyl)-oxamide and N,N'-bis-(p-aminopropyl)-piperazine; aromatic diprimary amines such as 4,4'-diaminodiphenylmethane, 4,4'-diaminodiphenylsulphide, 4,4'-diaminodiphenylether and 1-methyl-2,4-diaminobenzene; aralipatic diprimary diamines such as m-xylylene diamine, p-xylylene diamine, α,α,α',α'-tetramethyl-p-xylylene diamine and 1,3-bis-(β-aminoisopropyl)-benzene; diamines which contain sulfonic acid groups, e.g. 4,4'-diamino-stilbene-2,2'disulfonic acid or 4,4'-diaminodiphenylethane-2,2'disulfonic acid, ethylene diamine-N-butylsulphonic acid, hexamethylene-diamine-(1,6)-N-butylsulphonic acid, 1,6-diaminohexamethylene-3-sulphonc acid or alkali metal salts thereof; hydrazides such as carbodihydrazide, oxalic acid dihydrazide, malonic acid dihydrazide, succinic acid dihydrazide, hydracrylic acid dihydrazide, p-phenylene-diacetic acid dihydrazide, hydroquinone-diacetic acid dihydrazide, N-methyl-bis-(propionic acid hydrazide), N,N'-piperazine-bis-(propionic acid hydrazide), isophthalic acid dihydrazide, m/p-cyclohexanedicarboxylic acid hydrazide (cis/trans), hexamethylene-bis-semicarbazide, butanediol-bis-carbazic ester, aminoacetic acid hydrazide, and also hydrazine, e.g., also in the form of hydrazinde hydrate, and a dihydrazine such as N,N'-diaminopiperazine.

Secondary diamines, preferably those with a symmetrical structure, such as piperazine or 2,5-dimethylpiperazine, may also be used (although preferably in quantities of less than 30 mols percent).

These chain-lengthening agents may be combined with minor amounts of ethylene glycol, propylene glycol, butanediol-(1,4), hexanediol-(1,6), hydroquinone-bis-βhydroxy-ethylether and p-xylylene glycol.

In order to reduce the molecular weight or to obtain polyurethane and polyurethane-urea elastomers that are still soluble in spite of the branching having occurred, minor quantities of monofunctional compounds, e.g. 0.1 to 10 mols percent (based on the NCO content) may also be added such as butylamine, butylsemicarbazide or N,N'-dimethylhydrazine.

Particularly preferred chain-lengthening agents are ethylene diamine, m-xylylene diamine, hydrazine, carbohydrazide, oxalic or malonic acid dihydrazide or water, and these should amount to at least 50 mols percent, preferably more than 80 mols percent of the total quantity of chain-lengthening agents used. If mixtures of chain-lengthening agents are used, the solubility of the polyurethane or polyurethane urea usually rises and the melting point of the elastomers obtained falls.

The reaction with chain-lengthening agents is preferably carried out in highly polar water-soluble solvents boiling above 100° C. when NH-functional chain-lengthening agents are used. Suitable solvents for this purpose are compounds which contain amide or sulfoxide groups and are capable of formation of strong hydrogen bonds, for example dimethylformamide, diethylformamide, dimethylacetamide, formyl morpholine, hexamethylphosphoramide, dimethylsulphoxide, dimethylcyanamide or mixtures thereof. A commercially preferred solvent is dimethylformamide. One may add to the highly polar solvent a certain proportion, amounting to about 33 percent by weight of the total solvent quantity, of less highly polar solvents which are not capable of dissolving the polyurethane ureas or polyurethanes on their own, e.g., tetrahydrofuran, dioxane, acetone or glycol monomethyl ether acetate. The concentration of the elastomer solutions should preferably be about 5 to 33 percent by weight, in particular 15 to 27 percent by weight, and the viscosities should preferably lie between 1 and 1,000 poises, in particular 50 to 800 poises at 20° C.

The NH-functional chain-lengthening agents generally react very rapidly with the prepolymers to form the polyurethane ureas, so that the chain-lengthening reaction is generally carried out at temperatures below 100° C., either continuously or in stages, e.g., in the case of relatively sparingly soluble dihydrazide compounds it is carried out at about 50 to 70° C.

Room temperature is in most cases sufficient, and when very highly reactive aliphatic diamines or hydrazine are used, chain lengthening may sometimes be carried out with cooling, e.g., to −10° C., or alternatively the reaction is performed, instead of with free hydrazine or diamines, with suspensions of carbazic acids or aminocarbonates formed by the addition of $CO_2$ thereto (as described in German Auslegeschriften 1,222,253 and 1,223,154), which enables the process to be carried out without risk even at room temperature or elevated temperature, e.g., 65° C.

The reaction of the prepolymers is generally carried out with equivalent or excess quantities, e.g., 1 to 20 mols percent excess) of chain-lengthening agents. The higher the excess of chain-lengthening agents employed, the lower will be the molecular weight of the polyurethane or polyurethane urea. By careful addition of other, preferably less highly reactive aliphatic di- or triisocyanates, the molecular weight or solution viscosity can be adjusted to the desired value (as described in German Patent Specification 1,157,386). When the desired viscosity has been reached, the product can be stabilized by reacting the end groups with monoisocyanates such as butyl isocyanate, anhydrides such as acetic acid anhydride or other acylating compounds such as acid chlorides or carbamic acid chlorides.

Elastomeric polyureas which may be free from urethane groups and which are equally suitable for coagulation by the process claimed are obtained, for example, from high molecular weight (molecular weight 500 to 5,000) linear compounds carrying terminal amino or $-CO-NH.NH_2$ groups and diisocyanates, if desired in the presence of low molecular weight NH-functional chain-lengthening agents. One may add to the solutions of polyurethane-ureas, the following materials: Organic or inorganic pigments, dyes, optical brightening agents, UV absorbents, phenolic antioxidants special light protective agents such as N,N-dialkyl semicarbazides or N,N-dialkyl-hydrazides and cross-linking compounds such as paraformaldehyde, melamine hexamethylol ethers or other formaldehyde derivatives such as dimethylol dihydroxyethylene urea, dimethylol ethylene urea, melamine hexamethylolether, trimethylol melamine, dimethylol urea dimethyl ether, quaternizing agents such as dichloromethyl durene or polyaziridine ureas such as hexamethylene- α, ω-bis-ethylene imide urea. A cross-linking reaction which may, for example, be caused by heating increases the resistance against dissolving or swelling in highly polar solvents. Owing to the fact that they are built up of "soft segments" (polyhydroxy compound) and "hard segments" (e.g., molecule portions which can be thought of as built up of diisocyanates and NH-chain-lengthening agents or water), the above-mentioned polyurethane or polyurethane-urea elastomers show the properties of "cross-linking" takes place by means of the powerful hydrogen bonds within the urethane segments, and in particular the "urea segments."

The mechanical and elastic properties of films of these polyurethane solutions produced by drying the solutions on glass plates at 100° C., can be determined, e.g., after these films have been cut up into strips or filaments. Polyurethane-urea solutions which are particularly suitable for the process of the invention are those whose films have the following properties:

1. Melting point on the Kofler bench of at least 150° C., preferably above 100°C.,
2. Tensile strength of at least about 100 kg./cm.$^2$, preferably more than 200 kg./cm.$^2$
3. elongation at break of at least 200 percent, preferably 400 to 800 percent,
4. elastic modulus of at least 1 kg./cm.$^2$ and preferably 5 to 30 kg./cm.$^2$ on the first elongation by 20 percent; at least 5 kg./cm.$^2$ and preferably 20 to 75 kg./cm.$^2$ on elongation by 100 percent,
5. a molecular weight such that the inherent viscosity $$\eta = \frac{ln\eta_R}{C} \geq 0.5$$

preferably 0.70 to 1.9 when 1.0 g. of elastomer is dissolved at 20° C. in 100 ml. of hexamethyl-phosphoramide (phosphoric acid tridimethylamide) at 20° C. ($\eta_R$ =relative viscosity; C=concentration in g./100 ml. solution).

6. The polyurethanes and polyurethane ureas used in the process according to the invention should preferably not be soluble in only slightly polar solvents such as tetrahydrofuran, dioxane or glycol monomethyl ether acetate (without degradation) on their own, but only in highly polar solvents such as dimethylformamide.

The polymer solutions to be used according to the invention which contain fillers can be converted by known procedures into porous sheet structures which are permeable to water vapor. Thus, for example, a solution may be poured on to a glass plate and then dipped in water or alcohol in which the solvent is dissolved out of the resulting porous foil. The solution spread on to the support is preferably exposed to an atmosphere of vapor of a nonsolvent before the solvent is washed out in order to produce gelling. The time may vary from a few seconds to 16 hours or more and is preferably between 15 and 120 minutes. Any liquid which will not dissolve the polymer and not cause marked swelling and is immiscible with the solvent may be used as nonsolvent; preferred nonsolvents are water and alcohols that have one to three carbon atoms. Suitable atmospheres for producing this gelling effect contain 30 to 100 percent and preferably 60 to 99 percent of the saturation concentration of nonsolvent at the given temperature. In the case of water this is the corresponding relative atmospheric humidity. The sheet structures which may be gelled and which have then been freed from solvent by washing are dried below the softening temperature of the polymers, preferably at 60° to 120° C. The sheet structures can then be bonded to a porous substrate such as wood, split leather, fleece, textiles or paper, care being taken to ensure that the adhesive is not applied in a continuous layer because otherwise the porosity of the sheet material is impaired.

The porous sheet structures can also be formed directly on to porous supports. In this case, the solution of polymers containing filler are applied direct to the porous substrates the solutions are gelled, if desired, and the solvent is removed as described above.

The sheet structures produced according to the invention are particularly suitable for use as leather substitute and can be used, e.g., in shoe manufacture, in the upholstery and clothing industry and in the manufacture of luggage.

The invention is further illustrated by the following examples in which parts are by weight unless otherwise specified.

A. Production of Starting Material

Specification 1

About 19,500 parts of a copolyester of adipic acid, hexanediol-(1,6) and 2,2-dimethylpropanediol-(1,3), (molar ratio of the dialcohols about 65:35) of molecular weight 1,760 are heated to about 90° to 95° C. with about 1,614 parts of diphenylmethane-4,4'-diisocyanate for about 50 minutes. About 21,930 parts of the melt of the isocyanate-containing prepolymer so formed are introduced with intensive stirring into a solution of about 656 parts of carbodihydrazide in about 65,094 parts of dimethylformamide, a highly viscous elastomer solution (about 525 poises/20° C.) being produced. About 2 percent by weight (about 680 g. based on solids content) of 1,1-dimethyl-4-(3',5'-di-tertiary-butyl-4'-hydroxyphenylpropyl) semicarbazide and about 0.3 percent of 2-(2'-hydroxy-3'-tertiary-butyl-5-methylphenyl)-benzotriazole are added to the solution as stabilizers.

Specification 2

About 13,000 parts of a copolyester of the same composition as that used in specification 1 and having a molecular weight of about 1,650, are mixed with about 129 parts of bis-β-hydroxypropylmethylamine, and then about 1,900 parts of diphenylmethane-4,4'-diisocyanate are added at about 60° C. and the reaction mixture is then heated to an internal temperature of about 90° to 98° C. for about 50 minutes. About 15,610 parts of this molten isocyanate-containing prepolymer are then stirred into a suspension prepared by throwing about 500 parts of solid carbon dioxide into a solution of about 287 parts of ethylene diamine and about 38.6 parts of 1,2-propylenediamine in about 46,074 parts of dimethylformamide, $CO_2$ being liberated and a highly viscous elastomer solution (about 510 poises/20° C.) being obtained. About 1.2 percent by weight (based on solids content) of hexamethylene-N,N,N',N'-tetramethyl-bis-semicarbazide are incorporated in the solution as stabilizer.

Specification 3

About 800 parts of a polytetramethylene ether diol of OH number 54 are heated at about 80° C. with about 134.5 parts of toluylene-2,4-diisocyanate and about 234 parts of dioxane for about 85 minutes. About 370 parts of this NCO-containing prepolymer solution are introduced into a solution of about 11.15 parts of carbodihydrazide in about 763 parts of dimethylformamide with formation of an elastomer solution having a viscosity of about 116 poises. About 1 percent by weight each, based on the solids content, of tris-(3,5-di-tertiary-butyl-4-hydroxybenzyl)-mesitylene, 2-(2'-hydroxy-3'-tertiary butyl-5'-methyl-phenyl)-5-chloro-benzotriazole and poly-β-diethylaminoethyl-methacrylic ester are added to the elastomer solution as stabilizers.

Specification 4

About 360 parts of a prepolymer solution prepared as described in specification 3 are stirred at room temperature into a suspension prepared by throwing about 10 parts of solid carbon dioxide into a freshly prepared solution of about 6.86 parts of ethylene diamine and about 0.64 parts of hydrazine hydrate in about 791 parts of dimethylformamide. A clear elastomer solution with about 40 poises/20° C. is obtained.

Specification 5

About 400 parts of a polyester of caprolactone and diethylene glycol of molecular weight about 825 are heated to an internal temperature of about 95° to 98° C. together with about 167 parts of diphenylmethane-4,4'-diisocyanate (molar ratio about 1:1.38) and about 258 parts of dioxane for about 60 minutes. The solution subsequently cooled to room temperature has an NCO content of about 2.60 percent based on NCO containing prepolymer free from solvent.

About 537.5 parts of the prepolymer solution are stirred into a suspension of the diamine/$CO_2$ adducts prepared by throwing about 12 g. of solid carbon dioxide into a solution of about 6.30 parts of ethylene diamine and about 0.845 parts of propylene-1,2-diamine in about 923 parts of dimethylformamide, $CO_2$ being liberated from the carbonates, and a highly viscous, colorless elastomer solution (440 poises) being obtained.

Specification 6

About 800 parts of the polyester of specification 1 are heated to about 95° to 98° C. together with about 284 parts of diphenylmethane-4,4'-diisocyanate (molar ratio 1:2.5) for about 30 minutes.

About 350 parts of the isocyanate-containing melt (5.09 percent NCO) are introduced into a hot solution of about 20.5 parts of carbohydrazide in about 1,130 parts of dimethylformamide to form a viscous solution (250 poises) which becomes cloudy after standing for several minutes.

Specification 7

About 1,200 parts of the polyester used in specification 4 are heated to about 98° C. with about 297 parts of toluylene diisocyanate (about 80:20 isomer mixture) for about 2 hours. About 374 parts of the isocyanate containing melt (about 5.56 percent NCO) are introduced into a carbazic acid suspension prepared by introducing about 15 parts of solid carbon dioxide into a solution of about 12.90 parts of hydrazine hydrate in about 1,087 parts of dimethylformamide, to form a highly viscous elastomer solution. After dilution with about 138 parts of dimethylformamide, the solution viscosity is about 387 poises.

Specification 8

About 1,000 parts of the copolyester described in specification 1 are reacted together with about 17.7 parts of bis-(β- hydroxy-propyl)-methylamine and about 236.2 parts of 4,4'-diphenylmethane-diisocyanate for about 55 minutes at about 90° C. to form an isocyanate-containing prepolymer. About 500 parts of the prepolymer melt (at about 75° C.) are introduced into a suspension prepared by throwing 12 parts of solid carbon dioxide into a solution of about 5.80 parts of ethylene diamine and about 0.66 of 1,2-propylene diamine in about 1,520 parts of dimethylformamide, and the viscosity of the elastomer solution is adjusted to about 487 poises/20° C. by addition of about 0.57 parts of hexane-diisocyanate-(1,6).

Specification 9

About 600 parts of a linear polypropylene ether diol of molecular weight about 1,955 are heated on a boiling water bath with about 138 parts of diphenylmethane-4,4'-diisocyanate in the presence of about 0.02 percent triethylenediamine for about 125 minutes. About 209 parts of the isocyanate-containing prepolymer melt are stirred into a solution of about 6.11 parts of carbodihydrazide in about 620 parts of dimethylacetamide at about 65° C. The solution of about 164 poises viscosity so formed, forms a satisfactory film.

Specification 10

About 700 parts of a polyester of OH number 66.7 used in specification 1 and about 300 parts of polyethylene ether diol (molecular weight about 1,592) are heated on a boiling water bath with about 252.5 parts of diphenylmethane-4,4'-diisocyanate for about 80 minutes.

About 215 parts of the hot isocyanate-containing prepolymer melt are stirred into a suspension prepared by throwing about 10 parts of solid carbon dioxide into a solution of about 4.12 parts of ethylene diamine in about 612 parts of dimethylformamide, an elastomer solution having a viscosity of about 156 poises/10° C. being obtained.

Specification 11

About 430 parts of the isocyanate-containing prepolymer melt described in specification 10 are stirred into a suspension prepared by the addition of about 10 parts of solid carbon dioxide to a solution of about 5.78 parts of ethylene diamine in about 1,215 parts of dimethylformamide, to form an elastomer solution which has a viscosity of about 115 poises. About 0.8 percent of a reaction product of about 3 mols of ethylene imine and about 1 mol of biuret triisocyanate (prepared from about 3 mols of hexane-1,6-diisocyanate and about 1 mol of water) are added to the solution. From this solution foils which are very fast to light and which, after drying for 1 hour at about 110° C., are no longer soluble in dimethylformamide, are obtained.

Specification 12

About 1,700 parts of a polytetramethylene ether diol, molecular weight about 1,020, are heated to about 80° C. with about 623 parts of diphenyl methane-4,4'-diisocyanate and about 262 parts of dioxane for about 25 minutes. About 400 parts of this isocyanate-containing prepolymer solution are stirred into a suspension of about 18.8 parts of m-xylylene diamine and about 594 parts of dimethylsulphoxide in about 500 parts of dimethylacetamide to form a homogeneous, film-forming elastomer solution.

Specification 13

About 1,000 parts of the copolyester used in specification 1, about 19.5 parts of bis-($\beta$-hydroxypropyl)-methylamine and about 267 parts of diphenylmethane-4,4'-diisocyanate are heated to an internal temperature of about 90° to 96° C. for about 45 minutes. About 269 parts of the NCO prepolymer melt are introduced into a hot solution of about 6.73 parts of carbodihydrazide in about 770 parts of dimethylformamide to form a highly viscous elastomer solution having a viscosity of about 472 poises/20° C. about 19.5 parts of bis-($\beta$-hydroxypropyl)-methylamine and about 267 of diphenylmethane-4,4'-diisocyanate are heated to an internal temperature of about 90° to 96° C. for about 45 minutes. About 269 parts of the NCO prepolymer melt are introduced into a hot solution of about 6.73 parts of carbodihydrazide in about 770 parts of dimethylformamide to form a highly viscous elastomer solution having a viscosity of about 472 poises/20 °C.

Specification 14

About 19,500 parts of the copolyester described in specification 1 and about 4,224 parts of diphenylmethane-4,4'-diisocyanate are reacted together for about 45 minutes at temperatures between about 90° and 96° C. to form an isocyanate-containing prepolymer.

About 22,095 parts of this prepolymer melt are introduced into a solution heated to about 60° C. of about 475 parts of carbodihydrazide in about 66,665 parts of dimethylformamide, and the elastomer solution is adjusted to a viscosity of about 400 poises/20° C. by the addition of about 26.1 parts of hexane-1,6diisocyanate.

Specification 15

About 1,000 parts of a copolyester of adipic acid, ethylene glycol and butanediol-(1,4), (molar ratio of glycols 1:1), about 167 parts of hydroluinone-bis-$\beta$-hydroxyethylether, about 34.6 parts of butanediol-(1,4) and about 450 parts of diphenylmethane-4,4'-diisocyanate are mixed together in the melt at about 100° C. and reacted for about 30 minutes at about 130° C. to form a polyurethane which is then poured out to form thin plates which are after heated at about 100° C. after about 12 hours.

About 1,200 parts of the polyurethane (as granulate) are dissolved with about 9,600 parts of dimethylformamide at about 70° to 100° C. to form a polyurethane solution which has a 20 percent solids content and a viscosity of about 217 poises/20°B C.

Specification 16

About 1,200 parts of the copolyester used in specification 1 and about 264 parts of diphenylmethane-4,4'-diisocyanate are heated to about 96° C. for about 50 minutes.

About 470 parts of the isocyanate-containing melt are stirred while hot into a solution of about 15.5 parts of malonic acid dihydrazide in about 1,670 parts of dimethylformamide, to form a colorless, film-forming elastomer solution of about 463 poises viscosity on cooling.

B. Process according to the invention

Example 1

About 1,000 g. portions of the 25.8 percent polyurethane-urea solution obtained in specification 1 are treated with the quantities given in the table below of a finely divided silicic acid which has a shaken volume of about 17.5 cc./g. The silicic acid is produced by the combustion of silicon halide Before the silicic acid is added to the polyurethane solution, it should be made up into a paste stirring it into about 3 its quantity by weight of dimethylformamide in order that it may be more readily distributed in the polyurethane solution. The silicic acid containing polyurethane-urea solution is ventilated in a vacuum and then applied as a 1.5 mm. thick layer on to glass plates, stored for about 30 minutes at about 90 to 95 percent relative humidity and then treated with water for about 17 hours to remove the solvent. The foils are then dried at about 60° C. The foils show very high permeability to water vapor (Method IUP 15, published in "Das Leder" 1961, 86–88) of between about 8 and 27 mg./cm.$^2$hr. A comparable foil produced without silicic acid but in otherwise the same manner has a permeability to water vapor of 0.1 mg./cm.$^2$hr.

| Polyurethane urea according to specification 1 (g.) | Silicic acid | Proportion by weight of polyurethana urea:silicic acid | Premeability of the foil to water vapor (mg./cm.$^2$h.) |
|---|---|---|---|
| 1,000 | 64.5 | 80:20 | 8 |
|  | 86 | 75:25 | 11 |
|  | 130 | 67:33 | 8 |
|  | 260 | 50:50 | 11 |
|  | 520 | 33:67 | 27 |
|  | 600 | 30:70 | 16 |
|  | 775 | 25:75 | 19 |

Example 2

About 1,000 g. portions of the 25.8 percent polyurethane-urea solution obtained in specification 1 are thoroughly mixed with about 130 g. of the fillers indicated in the table below made up into a paste with about 260 g. of dimethylformamide and porous foils are made from this mixture by the procedure described in example 1. All the foils have very high permeability to water vapor. The ratio of polyurethane urea: filler is 67:33 parts by weight, based in the solid substance.

| Polyerethane urea solution according to Specification No. | Filler | Shaken volume of filler (cc./g.) | Permeability of foil to water vapor |
|---|---|---|---|
| 1 | Silicic acid, precipitated | 7 | 5.5 |
|   | ----do---- | 4.5 | 2 |
|   | Ca-silicate, precipitated | 5.5 | 2 |
|   | Aluminum silicate | 5 | 2 |
|   | Silicic acid [1] | 19.5 | 7 |
|   | Active charcoal | 4.5 | 2.5 |
|   | Kieselguhr | 3.3 | 1.5 |

[1] Prepared by thermal process.

Example 3

About 300 g. of the polyurethane-urea solution obtained in specification 2, diluted to about 20 percent with dimethylformamide, are stirred together with about 25.7 g. of a commercial precipitated silicic acid containing about 10 percent calcium silicate and having a shaken volume of about 6.9 cc./g., and the components are then thoroughly mixed in a ball mill for about 12 hours (proportion by weight of polyurethane urea: filler = 70:30 parts by weight). After about 14 days's storage this mixture is applied in a thickness of about 1.2 mm. to a metal plate and converted into a foil by the method described in example 1. The permeability to water vapor of the foil amounts to about 3.5 mg./cm.$^2$hr.

Example 4

About 1,000 g. of solution of the polyurethane urea obtained in specification 3 are stirred with about 134 parts of the filler used in example 3, and a microporous foil is produced as described therein. The foil has a permeability to water vapor of about 3.1 mg./cm.$^2$hr. The ratio of polyurethane urea:filler is 67:33 parts by weight.

Example 5

A microporous foil is prepared as described in example 4 from the polyurethane-urea solution obtained in specification 4. This foil has a permeability to water vapor of about 21 mg./cm.$^2$hr.

Example 6

About 300 g. of the polyurethane-urea solution obtained in specification 5 are diluted with about 56 g. of dimethylacetamide, and about 33 g. of a precipitated commercial silicic acid containing calcium silicate, of shaken volume 7 cc./g., are thoroughly mixed with this solution. This mixture is then made up into a foil as described in example 1, which after drying has a permeability to water vapor of about 11.5 mg./cm.$^2$hr. Ratio of polyurethane urea:silicic acid is 70:30 parts by weight.

The experiment is repeated but using methanol instead of water for washing the solvent out of the gelled film. After drying the foil has a permeability to water vapor of about 13.5 mg./cm.$^2$hr.

Example 7

About 300 g. of the 20 percent polyurethane solution obtained in specification 6 are thoroughly mixed with about 25.7 g. of the filler used in example 6; a porous foil is then produced as described in example 1. The permeability to water vapor of the foil is about 13.7 mg./cm.$^2$hr., the ratio of polyurethane:filler is 70:30.

Example 8

A micorporous foil is produced according to the method of example 1, whose permeability to water vapor is 2 mg./cm.$^2$, is prepared from about 300 g. of the 24 percent polyurethane-urea solution obtained in specification 7 and about 20.6 g. of the filler from example 6. The ratio of polyurethane urea:filler in the foil is 70:30 parts by weight.

Examples 9–13

Using the procedure of example 1, the mixture of polyurethane urea solution, dimethylformamide and filler from example 6 is made up into porous foils which contain polyurethane urea and filler in the ratio by weight of 70:30. All are highly permeable to water vapor.

| Ex. | Polyurethane urea solution | | Silicic acid as in Example 6 | Dimethyl-formamide | Permeability to water vapor (mg./cm.$^2$h.) |
|---|---|---|---|---|---|
|  | G. | From specification |  |  |  |
| 9 | 300 | 8 | 32 | 26 | 8.5 |
| 10 | 300 | 9 | 22 |  | 5.1 |
| 11 | 300 | 10 | 21.5 | 38 | 3.6 |
| 12 | 300 | 11 | 44 | 60 | 5.6 |
| 13 | 400 | 12 | 43 |  | 3.7 |

Example 10 is repeated but the solvent is leached out of the film with ethanol instead of water. After drying the foil obtained has a permeability to water vapor of about 3.4 mg./cm.$^2$hr.

Examples 14–16

About 300 g. of the polyurethane solutions obtained in specifications 14, 15, and 16 are treated with such a quantity of commercial finely divided silicic acid of shaken volume 7.5 cc./g., that the ratio of solid polyurethane to solid filler is 70:30 parts by weight. The solutions are applied in about 1.7 mm. thick layers on to a dense fleece bonded with butadiene-acrylonitrile copolymers, gelled for about 5 minutes in a current of air of about 96 to 98 percent relative humidity at about 23° C. and then dipped into water. After about 5 hours' treatment in water, excess water is squeezed off, the layers are again treated with water and again squeezed, and are then dried at about 60° C. The laminated substances thus obtained had the permeabilities to water vapor indicated in the table.

| Example | G. of filler to 300 g. of polyurethane solution | Permeability to water vapor (mg./cm.$^2$h.) |
|---|---|---|
| 14 | 32 (+80 g. dimethylformamide) | 4.1 |
| 15 | 26 | 4.5 |
| 16 | 29 | 3.0 |

Example 17

About 60 g. of polyvinyl chloride are dissolved in about 450 g. of dimethylformamide and about 90 g. of the filler used in examples 14–16 are thoroughly mixed with this solution. About 600 g. of the polyurethane-urea solution obtained in specification 1 are then stirred in and about 3 g. of a brown water-soluble acid leather dye are dissolved therein. The solution is spread in a layer of about 1.75 mm. on to a glass plate, gelled in a current of air at about 25° C. and about 85 to 95 percent relative humidity, and then immersed in water for about 16 hours to wash out the solvent. After drying at about 40° C. in a current of air, the foil is bonded with a two-component adhesive on to the smooth side of a brown twill fabric which is roughened on one side. The adhesive is of such consistency that it can be sprayed as a fibrous substance on to the foil and the fabric by means of a spray gun. After adhesion, the laminar material has a permeability to water vapor of about 2.5 mg./cm.$^2$hr.

Example 18

About 53 g. of a finely divided silicic acid of shaken volume 17.5 cc./g. (ratio 70:30) are added to about 1,000 g. of the polyurethane solution obtained in specification 13, the two components are thoroughly mixed together, and this mixture is applied in a layer of about 1.6 mm. on to a m metal plate. It is then immersed in water and left overnight. After drying, the foil has a permeability to water vapor of about 9 mg./cm.$^2$hr.

It is to be understood that the foregoing working examples are given for the purpose of illustration and that any other suitable filler, solvent, nonsolvent, polyurethane, polyurethane-urea or the like could be substituted therein provided that the teachings of this disclosure are followed.

Although the invention has been described in considerable detail in the foregoing, it is to be understood that such detail is solely for the purpose of illustration and that many variations can be made by those skilled in the art without departing from the spirit and scope of the invention except as set forth in claims.

What is claimed is:

1. A process for the production of microporous sheet structures permeable to water vapor which comprises preparing a solution of a film-forming polyurethane-urea polymer by dissolving the polymer in a solvent therefor, said polymer having a molecular weight of at water-vapor 10,000, introducing a finely divided inorganic filler which is insoluble in the solvent and which has a shaken volume of at least 3 cc./g. into said solution at a concentration of from about 25 to about 90 percent by weight based on the mixture of polyurethane-urea and filler, treating the resulting composition with a nonsolvent for the polymer and the inorganic filler, said nonsolvent being miscible with the polyurethane-urea solvent, shaping the resulting solution into a film or foil and removing the solvent and nonsolvent.

2. The process of claim 1 wherein the finely divided inorganic filler has a shaken volume of from 6 to 20 cc. per gram.

3. The process of claim 1 wherein said solution of film-forming polyurethane-urea is prepared in dimethyl-formamide and said nonsolvent is water.

4. The process of claim 1 wherein said inorganic filler is silicic acid, calcium silicate, aluminum silicate, activated charcoal, or kieselguhr.

5. Microporous sheet structures prepared by the process of claim 1.

6. The microporous sheet structure of claim 5 having a melting point on the Kofler bench of at least 150° C., a tensile strength of at least about 100 kg./cm.$^2$, an elongation at break of at least 200 percent, an elastic modulus of at least 1 kg./cm.$^2$ on the first elongation by 20 percent and at least 5 kg./cm.$^2$ on elongation by 100 percent, and a molecular weight which corresponds to an inherent viscosity of at least 0.5 when 1 gram of the polymer is dissolved at 20° C. in 100 ml. of hexamethylphosphoramide.

* * * * *